United States Patent
Baloch et al.

(10) Patent No.: US 9,195,223 B2
(45) Date of Patent: Nov. 24, 2015

(54) MOTOR CONTROLLER AND MOTOR SYSTEM

(71) Applicant: KABUSHIKI KAISHA YASKAWA DENKI, Kitakyushu-shi (JP)

(72) Inventors: Noor Aamir Baloch, Kitakyushu (JP); Kozo Ide, Kitakyushu (JP); Shinya Morimoto, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 37 days.

(21) Appl. No.: 14/301,286

(22) Filed: Jun. 10, 2014

(65) Prior Publication Data
US 2014/0292248 A1 Oct. 2, 2014

Related U.S. Application Data

(63) Continuation of application No. PCT/JP2011/078948, filed on Dec. 14, 2011.

(51) Int. Cl.
G05B 13/00 (2006.01)
G05B 13/04 (2006.01)
H02P 21/13 (2006.01)
H02P 21/14 (2006.01)
H02P 23/12 (2006.01)

(52) U.S. Cl.
CPC .............. G05B 13/04 (2013.01); G05B 13/042 (2013.01); H02P 21/13 (2013.01); H02P 21/146 (2013.01); H02P 23/12 (2013.01)

(58) Field of Classification Search
CPC ......... H02P 23/14; H02P 23/12; H02P 23/13; H02P 21/146; H02P 23/0036; G05B 13/04; G05B 2219/41124; G05B 2219/41395
See application file for complete search history.

(56) References Cited

U.S. PATENT DOCUMENTS

2013/0257339 A1* 10/2013 Kim .................... G05B 13/0245
318/561

FOREIGN PATENT DOCUMENTS

| JP | 04-281381 | 10/1992 |
|----|-----------|---------|
| JP | 07-337100 | 12/1995 |

(Continued)

OTHER PUBLICATIONS

International Search Report for corresponding International Application No. PCT/JP2011/078948, Mar. 19, 2012.

(Continued)

Primary Examiner — Karen Masih
(74) Attorney, Agent, or Firm — Mori & Ward, LLP (57) ABSTRACT

A motor controller includes a position speed estimation section and a control section. The position speed estimation section outputs a motor estimated position and a motor estimated speed based on a position estimated error, which is a difference between a motor position of a motor and the motor estimated position. An observer modifier outputs an observer modification value based on the position estimated error. A nonlinear compensator outputs a compensation torque based on the position estimated error. An operator outputs an operation value based on the observer modification value and the compensation torque. A motor model outputs the motor estimated position and the motor estimated speed based on the operation value. The control section outputs a torque command based on the motor estimated position, the motor estimated speed, and a position command to control the motor.

7 Claims, 7 Drawing Sheets

(56) References Cited

FOREIGN PATENT DOCUMENTS

| | | |
|---|---|---|
| JP | 10-262387 | 9/1998 |
| JP | 2005-198404 | 7/2005 |

OTHER PUBLICATIONS

Written Opinion for corresponding International Application No. PCT/JP2011/078948, Mar. 19, 2012.

* cited by examiner

0.1 times as great a load

FIG. 5C 15 times as great a load (A)

(B)

… … …

MOTOR CONTROLLER AND MOTOR SYSTEM

CROSS-REFERENCE TO RELATED APPLICATIONS

The present application is a continuation application of International Application No. PCT/JP2011/078948, filed Dec. 14, 2011. The contents of this application are incorporated herein by reference in their entirety.

BACKGROUND

1. Field of the Invention

The present invention relates to a motor controller and a motor system.

2. Discussion of the Background

Japanese Unexamined Patent Application Publication No. 10-262387 discloses state estimation means for estimating a rotation speed and a rotation position of a body of rotation. The state estimation means performs the estimation based on a model body of rotation on which a control torque of a value detected by control torque detection means acts and on which a disturbance torque of an estimated value acts. Here, the state estimation means uses initial values of a provided rotation speed and a provided rotation position.

According to one aspect of the present disclosure, a motor controller includes a position speed estimation section and a control section. The position speed estimation section is configured to output a motor estimated position and a motor estimated speed based on a position estimated error. The position estimated error is a difference between a motor position of a motor and the motor estimated position. The position speed estimation section includes an observer modifier, a nonlinear compensator, an operator, and a motor model of the motor. The observer modifier is configured to output an observer modification value based on the position estimated error. The nonlinear compensator is configured to output a compensation torque based on the position estimated error. The operator is configured to output an operation value based on the observer modification value and the compensation torque. The motor model is configured to output the motor estimated position and the motor estimated speed based on the operation value. The control section is configured to output a torque command based on the motor estimated position, the motor estimated speed, and a position command so as to control the motor.

According to another aspect of the present disclosure, a motor system includes the above-described motor controller, a motor, and a position acquirer. The motor is controllable in accordance with a torque command output from the motor controller. The position acquirer is configured to acquire a motor position of the motor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings. It is noted that the drawings may omit those elements irrelevant to the understanding of the embodiments.

Figure 1:
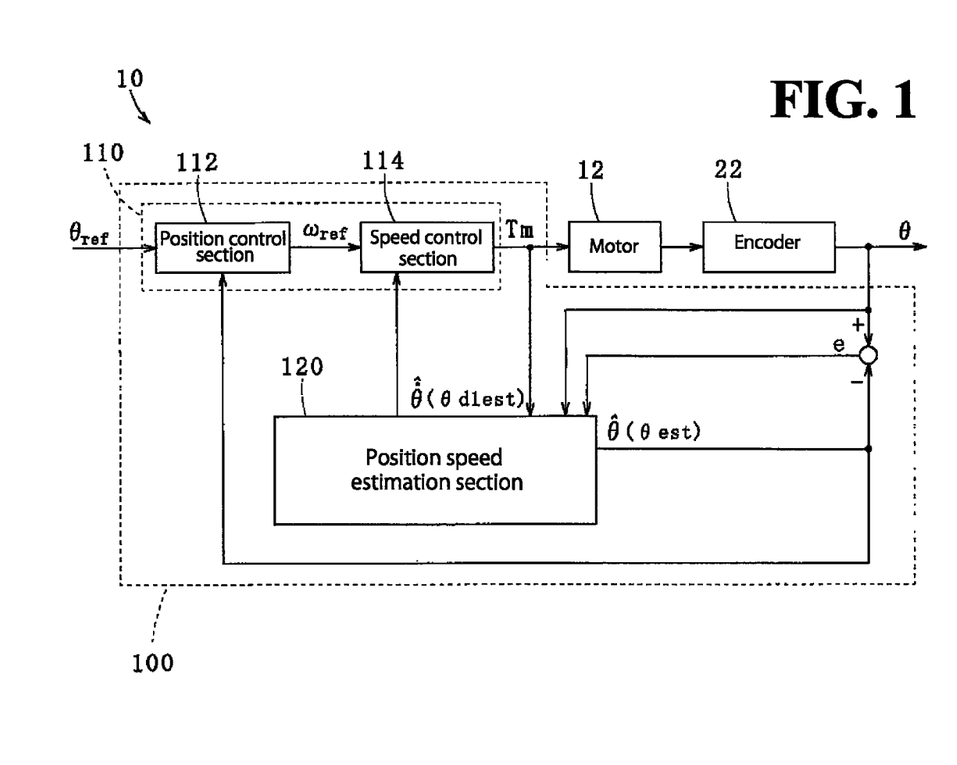
FIG. 1 is a block diagram of a motor system according to an embodiment.

As shown in FIG. 1, a motor system 10 according to this embodiment includes a motor 12, a motor controller 100, and an encoder 22.

An example of the motor 12 is a rotary motor.

The motor controller 100 is coupled to the motor 12 and capable of outputting a torque command Tm based on a set position command θref so as to control the motor 12.

The encoder (which is an example of the position acquirer) 22 is capable of acquiring a rotation position (motor position) of the motor 12. The encoder 22 is disposed at a shaft of the motor 12, for example.

The position acquirer will not be limited to an encoder but may be a position estimation device that outputs an estimated position of the motor based on position sensor-less control (which may be occasionally referred to as encoder-less control).

Next, the motor controller 100 will be described in detail.

The motor controller 100 includes a control section 110 and a position speed estimation section 120.

The control section 110 includes a position control section 112 and a speed control section 114, and is capable of outputting the torque command Tm, which is used to control the motor 12, based on the position command θref, $\hat{\theta}$, and $\hat{\dot{\theta}}$. $\hat{\theta}$ is an estimated position of the motor 12. $\hat{\dot{\theta}}$ is an estimated speed of the motor 12.

In the following description, the motor estimated position $\hat{\theta}$ may be occasionally referred to as θest, and the motor estimated speed $\hat{\dot{\theta}}$ may be occasionally referred to as θd1est.

The position control section 112 is capable of outputting a speed command ωref based on the position command θref and the motor estimated position θ output from the position speed estimation section 120 in accordance with P control operation (proportional control operation), for example.

The speed control section 114 is capable of generating a torque command Tm based on the speed command ωref output from the position control section 112 and the motor estimated speed θd1est output from the position speed estimation section 120 in accordance with PI control operation (proportional integration control operation), for example.

Figure 2:
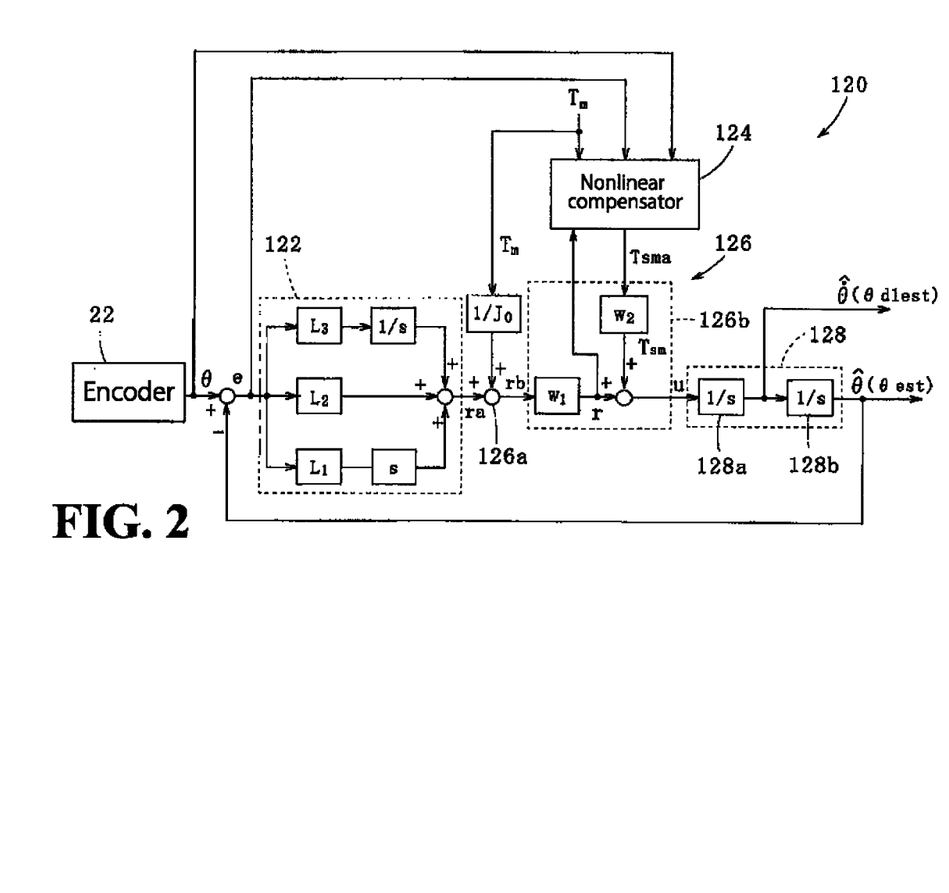
FIG. 2 is a block diagram of a position speed estimation section of a motor controller provided in the motor system.

As shown in FIG. 2, the position speed estimation section 120 is capable of outputting the motor estimated position θest and the motor estimated speed θd1est based on a position estimated error e. The position estimated error e is a difference between the motor position θ output from the encoder 22 and the motor estimated position θest output from the position speed estimation section 120.

The position speed estimation section 120 includes an observer modifier 122, a nonlinear compensator 124, an operator 126, and a motor model 128. The motor model 128 is a model of the motor 12.

The observer modifier 122 is capable of outputting an observer modification value ra based on the position estimated error e. Specifically, the observer modifier 122 is capable of outputting the observer modification value ra to decrease the position estimated error e to zero.

As the following equation indicates, the observer modifier 122 is capable of multiplying the position estimated error e by observer gains $L_1$, $L_2$, and $L_3$, which are determined based on an observer cut-off frequency f, and is capable of obtaining the observer modification value ra by PID control operation. In the following equation, s denotes a Laplace operator.

$$ra = L_3 \cdot e/s + L_2 \cdot e + L_1 \cdot s \cdot e \quad (1)$$

Figure 3:
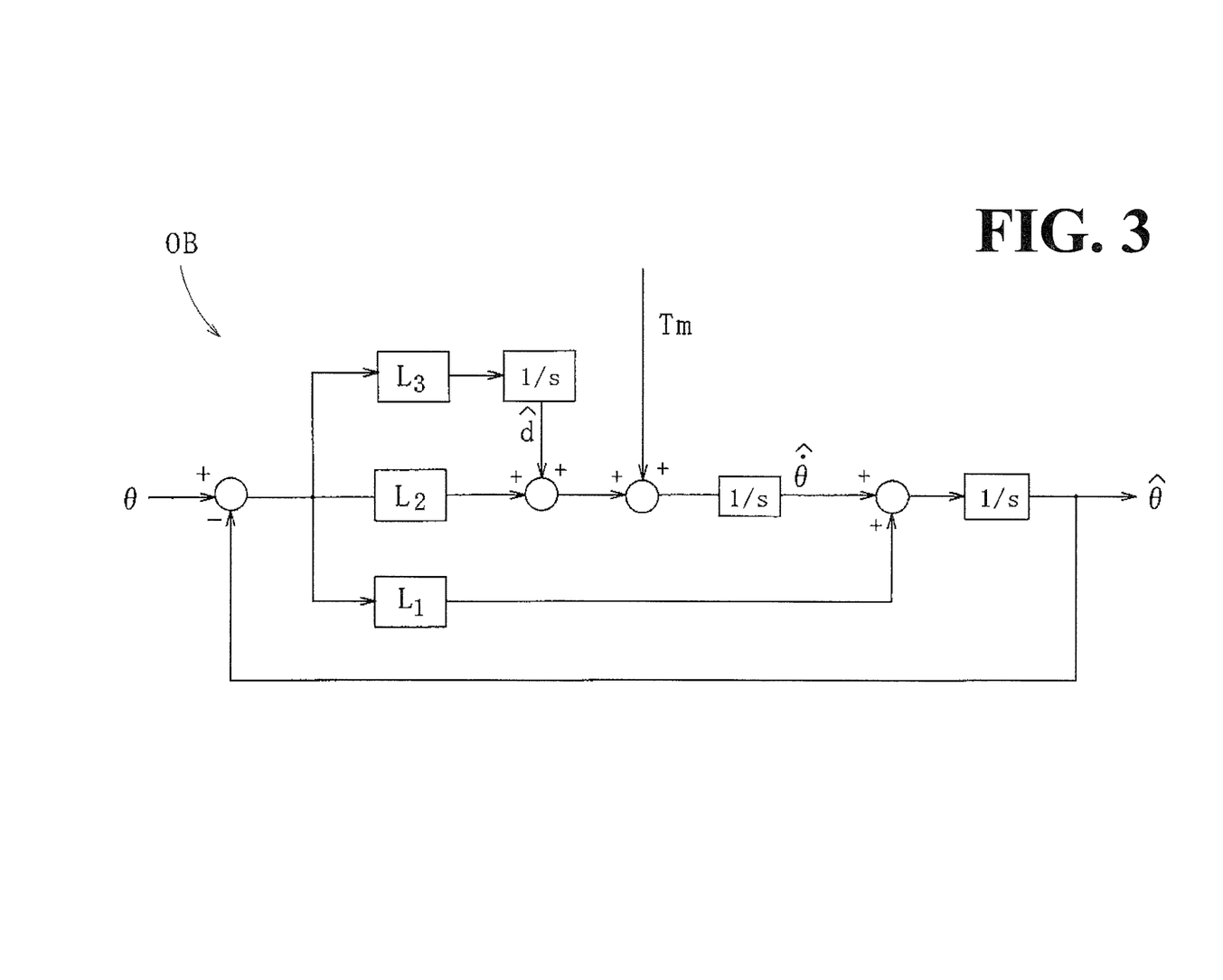
FIG. 3 is a block diagram of an observer, illustrating a method of setting an observer gain of an observer modifier.

Here, an exemplary method of setting the observer gains $L_1$ to $L_3$ will be described.

As shown in FIG. 3, the observer gains $L_1$ to $L_3$ may be set based on an exemplary observer OB. The observer OB estimates the motor position based on the motor position θ and the torque command Tm.

A state equation of the observer OB may be represented by the following equation:

$$\frac{d}{dt}\begin{bmatrix} \hat{\theta} \\ \hat{\dot{\theta}} \\ \hat{d} \end{bmatrix} = \begin{bmatrix} 0 & 1 & 0 \\ 0 & 0 & 1 \\ 0 & 0 & 0 \end{bmatrix} \cdot \begin{bmatrix} \hat{\theta} \\ \hat{\dot{\theta}} \\ \hat{d} \end{bmatrix} + \begin{bmatrix} 0 \\ 1 \\ 0 \end{bmatrix} Tm + \begin{bmatrix} L_1 \\ L_2 \\ L_3 \end{bmatrix}(\theta - \hat{\theta}) \quad (OB1)$$

Here, matrices A, L, and C are defined as follows:

$$A = \begin{bmatrix} 0 & 1 & 0 \\ 0 & 0 & 1 \\ 0 & 0 & 0 \end{bmatrix} \quad (OB2)$$

$$L = \begin{bmatrix} L_1 \\ L_2 \\ L_3 \end{bmatrix} \quad (OB3)$$

$$C = [1 \ 0 \ 0] \quad (OB4)$$

As shown in FIG. 3, $\hat{d}$ denotes an integrated value of the value output from the observer gain L3.

A characteristic equation may be represented by the following equation:

$$det|sI-(A-LC)| = 0 \quad (OB5)$$

By making the polarity of the characteristic equation tripole ω, the following equation is obtained:

$$det|sI-(A-LC)| = (s+\omega)^3 \quad (OB6)$$

Substituting Equations (OB2) to (OB4) into Equation (OB6) provides Equations (OB7) to (OB11), which result in Equation (OB12).

$$det\left|\begin{bmatrix} s & 0 & 0 \\ 0 & s & 0 \\ 0 & 0 & s \end{bmatrix} - \begin{bmatrix} 0 & 1 & 0 \\ 0 & 0 & 1 \\ 0 & 0 & 0 \end{bmatrix} + \begin{bmatrix} L_1 \\ L_2 \\ L_3 \end{bmatrix} \cdot [1 \ 0 \ 0]\right| = (s+\omega)^3 \quad (OB7)$$

$$det\left|\begin{bmatrix} L_1+s & -1 & 0 \\ L_2 & s & -1 \\ L_3 & 0 & s \end{bmatrix}\right| = (s+\omega)^3 \quad (OB8)$$

$$(L_1+s)\begin{vmatrix} s & -1 \\ 0 & s \end{vmatrix} + \begin{vmatrix} L_2 & -1 \\ L_3 & s \end{vmatrix} = (s+\omega)^3 \quad (OB9)$$

$$(L_1+s)s^2 + (L_2 s + L_3) = (s+\omega)^3 \quad (OB10)$$

$$L_1 s^2 + s^3 + L_2 s + L_3 = (s+\omega)^3 \quad (OB11)$$

$$s^3 + L_1 s^2 + L_2 s + L_3 = s^3 + 3s^2\omega + 3s\omega^2 + \omega^3 \quad (OB12)$$

In Equation (OB12), a comparison between corresponding coefficients of the Laplace operators s shows that the observer gains $L_1$ to $L_3$ may be set as follows:

$$L_1 = 3\omega \quad (OB13)$$

$$L_2 = 3\omega^2 \quad (OB14)$$

$$L_3 = \omega^3 \quad (OB15)$$

It is noted, however, that the pole w may be represented by the following equation:

$$\omega = 2\pi f \quad (OB16)$$

In Equation (OB16), f denotes a cut-off frequency of the above-described observer.

The nonlinear compensator 124 is capable of compensating for position or speed in an exemplary case of the encoder 22 having low resolution, thereby improving robustness of the control system. Also the nonlinear compensator 124 is capable of improving robustness of the control system by compensating for a control target model error (change error) in an observer that compensates for a speed detection error in a low speed region.

As shown in FIG. 2, the nonlinear compensator 124 is capable of outputting a compensation torque Tsma based on the position estimated error e.

Specifically, the nonlinear compensator 124 receives the motor position θ, the position estimated error e, the torque command Tm, and a product r of a sum rb, described later, and a first weighting constant w1, and is capable of obtaining the compensation torque Tsma at least in accordance with a change in polarity of the product r.

A method of designing the nonlinear compensator 124 and the operation details for outputting the compensation torque Tsma will be described later.

The operator 126 includes an adder 126a and an addition distributer 126b. Based on the observer modification value ra and the compensation torque Tsma, the operator 126 is capable of outputting an input value u, which is input into the motor model 128 of the motor 12, as an operation value.

As the following equation indicates, the adder 126a is capable of dividing the torque command Tm by an inertia nominal value J0 of the motor 12 to obtain a quotient Tm/J0, adding the quotient Tm/J0 to the observer modification value ra, and outputting the sum rb.

$$rb = Tm/J0 + ra \quad (2)$$

As the following equation indicates, the addition distributer 126b is capable of adding the compensation torque Tsma to the sum rb output from the adder 126a based on an addition distribution determined using weighting constants w1 and w2 so as to obtain a sum as the input value u to the motor model 128. An example of the weighting constant w1 is a first weighting constant w1 for the sum rb, and an example of the weighting constant w2 is a second weighting constant w2 for the compensation torque Tsma.

$$u = w1 \cdot rb + w2 \cdot Tsma \quad \text{Equation (3a)}$$
$$= r + Tsm \quad \text{Equation (3b)}$$

Here, the first weighting constant w1 is preferably smaller than the second weighting constant w2. Specifically, the first weighting constant w1 is preferably 0.1 to 0.5, for example, while the second weighting constant w2 is preferably a value that approximates to 1 (for example, 0.9 to 1.1).

The product r (=w1·rb) is an input value to the motor model 128 and is not yet compensated for by a compensation torque Tsm. Thus, the product r may occasionally be referred to as a pre-compensation motor model input.

The motor model 128 includes two integrators 128a and 128b, which are coupled to each other in series.

The integrator 128a is capable of integrating the input value u and outputting the motor estimated speed θd1est.

The integrator 128b is capable of integrating the motor estimated speed θd1 and outputting the motor estimated position θest.

That is, the motor model 128 is capable of outputting the motor estimated position θest and the motor estimated speed θd1 based on the input value u output from the operator 126.

Next, a method of designing the nonlinear compensator 124 will be described.

The motor model 128 is a model without friction taken into consideration. Thus, when the inertia nominal value J0 of the motor 12 greatly differs from the actual inertia of the motor 12 and the load system, or when there is a high level of friction, the observer modifier 122 may not be able to sufficiently modify the input value u to the motor model. This may cause hunting of the position estimated error e in a transient state or cause a delayed convergence.

In view of this, in order to ensure asymptotic stability of the pre-compensation motor model input r, an evaluation function V is defined as in the following equation:

$$V = \frac{J_0 r^2}{2} \quad \text{(C1)}$$

A necessary and sufficient condition for asymptotic stability of the pre-compensation motor model input r is represented by the following equation:

$$=\dot{V}=J_0 r \dot{r} < 0 \quad \text{(C2)}$$

Here, the input value u to the motor model can be represented as an inverse model from the model output as in the following equation:

$$u = \ddot{\theta} + F \quad \text{(C3)}$$
$$= \ddot{\theta}_r - \ddot{e} + F$$

Here, a second derivative of a new variable θr is defined as in the following equation:

$$\ddot{\theta}_r L_3 \Delta \theta + L_2 \Delta \dot{\theta} + L_1 \ddot{\theta} \quad \text{(C4)}$$

From Equation (C4), the following equation is derived:

$$J_0 \dot{r} = u w_1 J_0 L_1 + w_1 \dot{T}_m + w_1 J_0 \ddot{\theta}_r + F w_1 J_0 L_1 \quad \text{(C5)}$$

In Equation (C5), F denotes a system disturbance.

Incidentally, as indicated in Equations (3a) and (3b), the input value u to the motor model is also a sum of the pre-compensation motor model input r (=w1·rb) and the compensation torque Tsm (=w2·Tsma). The compensation torque Tsm is a product of the compensation torque Tsma and the weighting constant w2.

From Equations (3a) and (3b), u=r+w2·Tsma is obtained. Substituting u=r+w2·Tsma into Equation (C5) provides the following equation:

$$J_0 \dot{r} = -r w_1 J_0 L_1 + w_1 J_0 L_1 \left( \frac{\dot{T}_m}{J_0 L_1} + \frac{\ddot{\theta}_r}{L_1} + F - w_2 T_{sma} \right) \quad \text{(C6)}$$

Substituting Equation (C6) into Equation (C2) provides the following equation:

$$\dot{V} = -r^2 w_1 J_0 L_1 + r w_1 J_0 L_1 \left( \frac{\dot{T}_m}{J_0 L_1} + \frac{\ddot{\theta}_r}{L_1} + F - w_2 T_{sma} \right) \quad \text{(C7)}$$

The first item on the right-hand side of Equation (C7) is constantly negative, and thus a condition for satisfying the following equation is that the second item on the right-hand side is negative.

$$\dot{V} < 0 \quad \text{(C8)}$$

That is, the following equation is obtained:

$$r w_1 J_0 L_1 \left( \frac{\dot{T}_m}{J_0 L_1} + \frac{\ddot{\theta}_r}{L_1} + F - w_2 T_{sma} \right) < 0 \quad \text{(C9)}$$

Thus, designing the compensation torque Tsma to satisfy Equation (C9) provides the following equation:

$$T_{sma} = signum(r) \cdot \left( \frac{|\dot{T}_m|}{J_{mn} L_{1a}} + \frac{|\ddot{\theta}_r|}{L_{1a}} + F_{max} \right) \quad \text{(C10a)}$$

Figure 4:
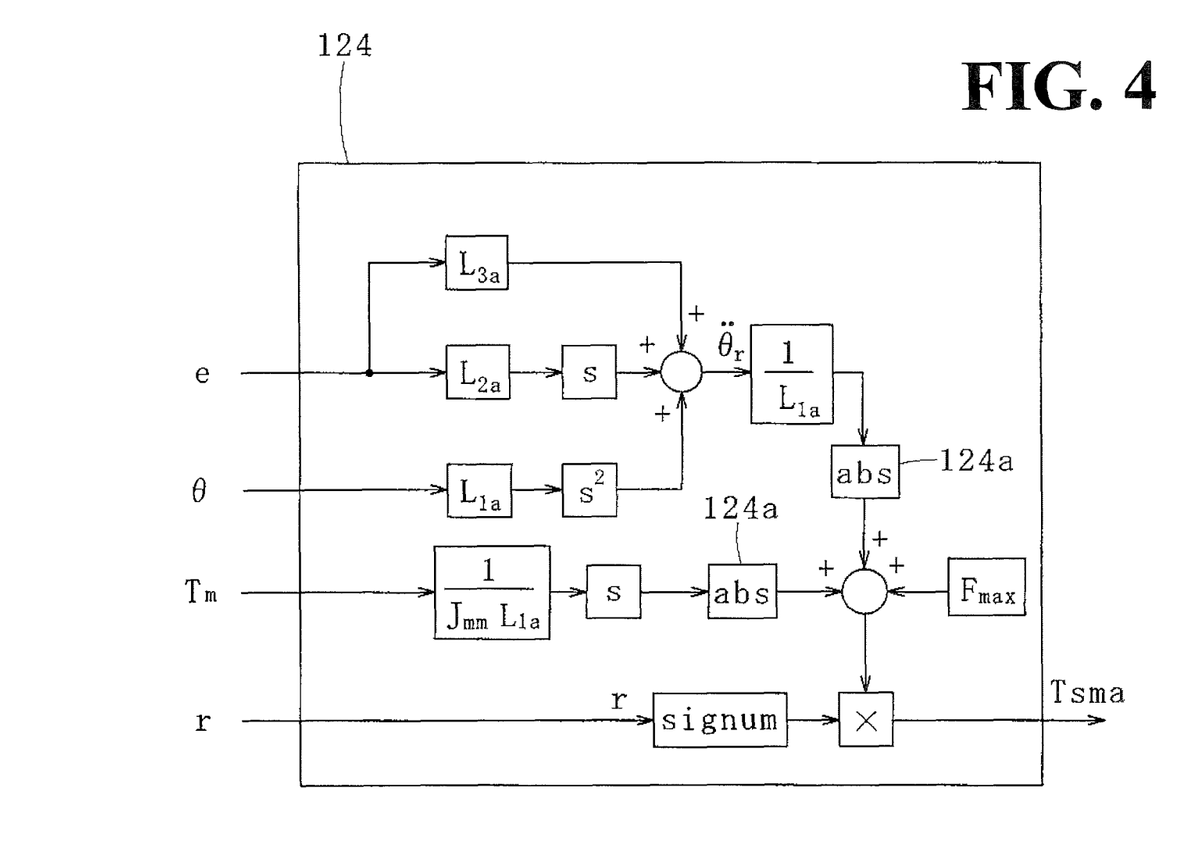
FIG. 4 is a block diagram of a nonlinear compensator of the motor controller provided in the motor system.

In Equation (C10a), Jmm=γ·J0(γ≤1), γ denotes an adjustment parameter (which is a parameter to make Jmm as smaller as possible than Jo), Fmax denotes an expected maximum system disturbance value, and $L_{1a}$ denotes an adjustment gain The nonlinear compensator 124 in Equation (C10a) may be represented by the control block diagram shown in FIG. 4 using a function 124a, which outputs an input absolute value. In FIG. 4, adjustment gains $L_{1a}$ to $L_{3a}$ are preferably set at values that are respectively the same as the observer gains $L_1$ to $L_3$. It is also possible to equalize the adjustment gains $L_{1a}$ to $L_{3a}$.

It is noted, however, that Equation (C10a) may frequently change its polarity depending on the polarity of the pre-compensation motor model input r, and this may cause a chattering phenomenon. In view of this, it is possible to add a function containing a chattering reduction operator δ as in the following equation:

$$T_{sma} = \frac{r}{\delta + |r|} \cdot \left( \frac{|\dot{T}_m|}{J_{mm}L_{1a}} + \frac{|\ddot{\theta}_r|}{L_{1a}} + F_{max} \right) \quad \text{(C10b)}$$

Thus, the design to make the nonlinear compensator 124 output the compensation torque Tsma based on Equation (C10a) or (C10b) ensures that the compensation torque Tsm is obtained as a product of the compensation torque Tsma and the weighting constant w2 as represented by the following Equation (C11). This ensures a robust control system even though errors may occur due to change in load inertia or setting of parameters containing the motor or load inertia when an encoder of low resolution is used or when position speed control is performed by position sensor-less control.

$$Tsm = w2 \cdot Tsma \quad \text{(C11)}$$

Next, the motor controller 100 will be described in more detail using simulation examples.

Figure 5A:
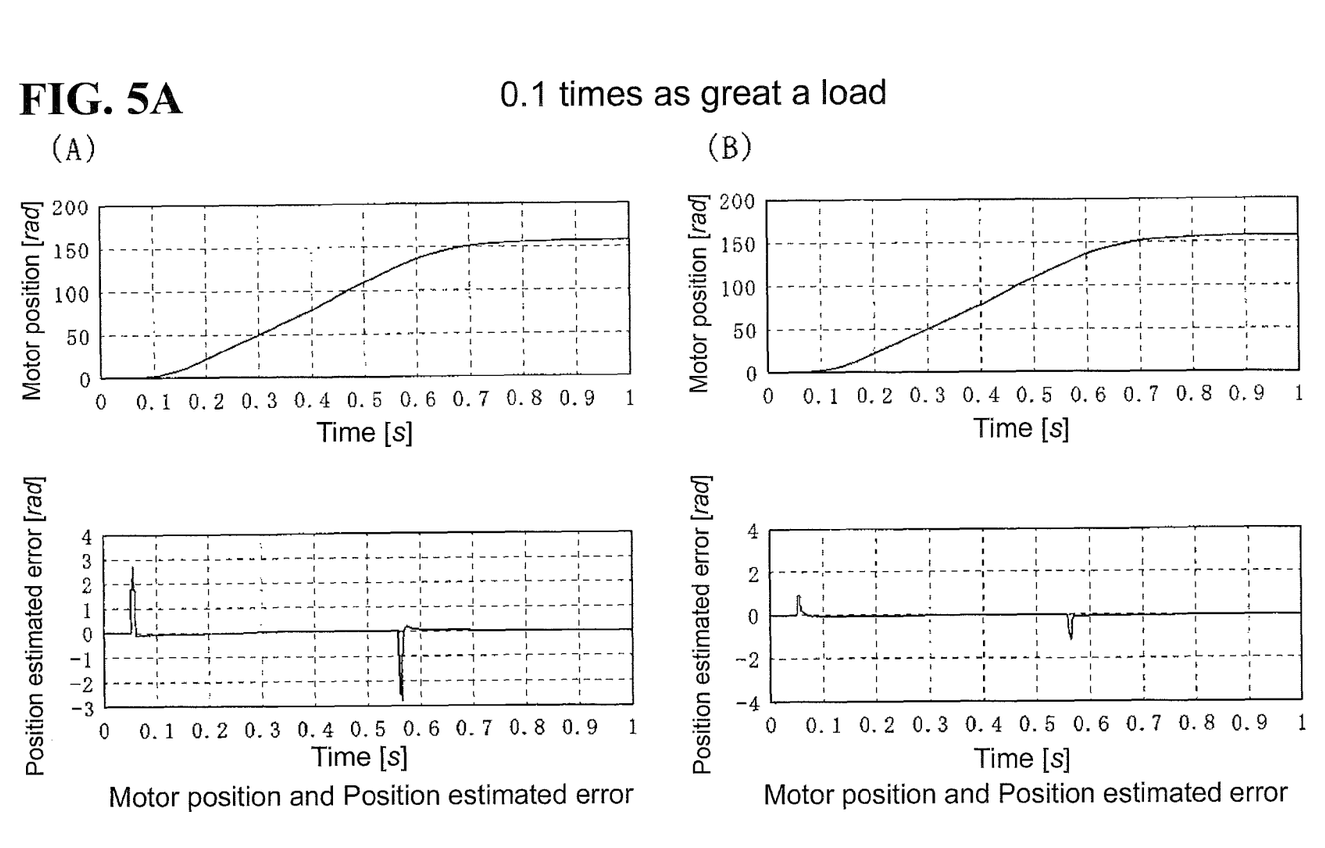
FIG. 5A shows a graph group (A) of a position estimated error associated with a conventional motor controller, and a graph group (B) of a position estimated error associated with the motor controller of the motor system according to the embodiment with a load inertia of 0.1 times a motor inertia.
Figure 5B:
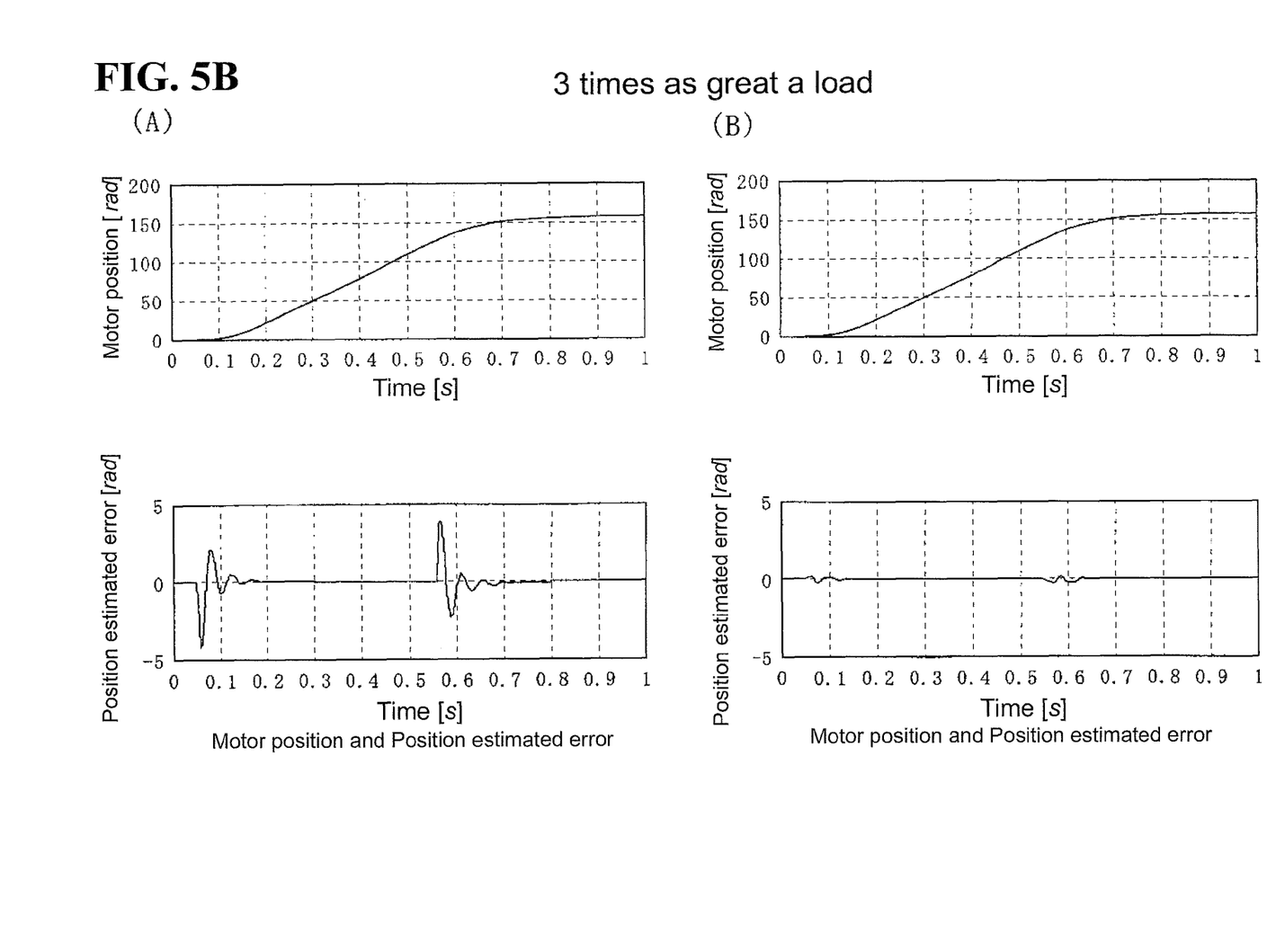
FIG. 5B shows a graph group (A) of a position estimated error associated with the conventional motor controller, and a graph group (B) of a position estimated error associated with the motor controller of the motor system according to the embodiment with a load inertia of 3 times the motor inertia.
Figure 5C:
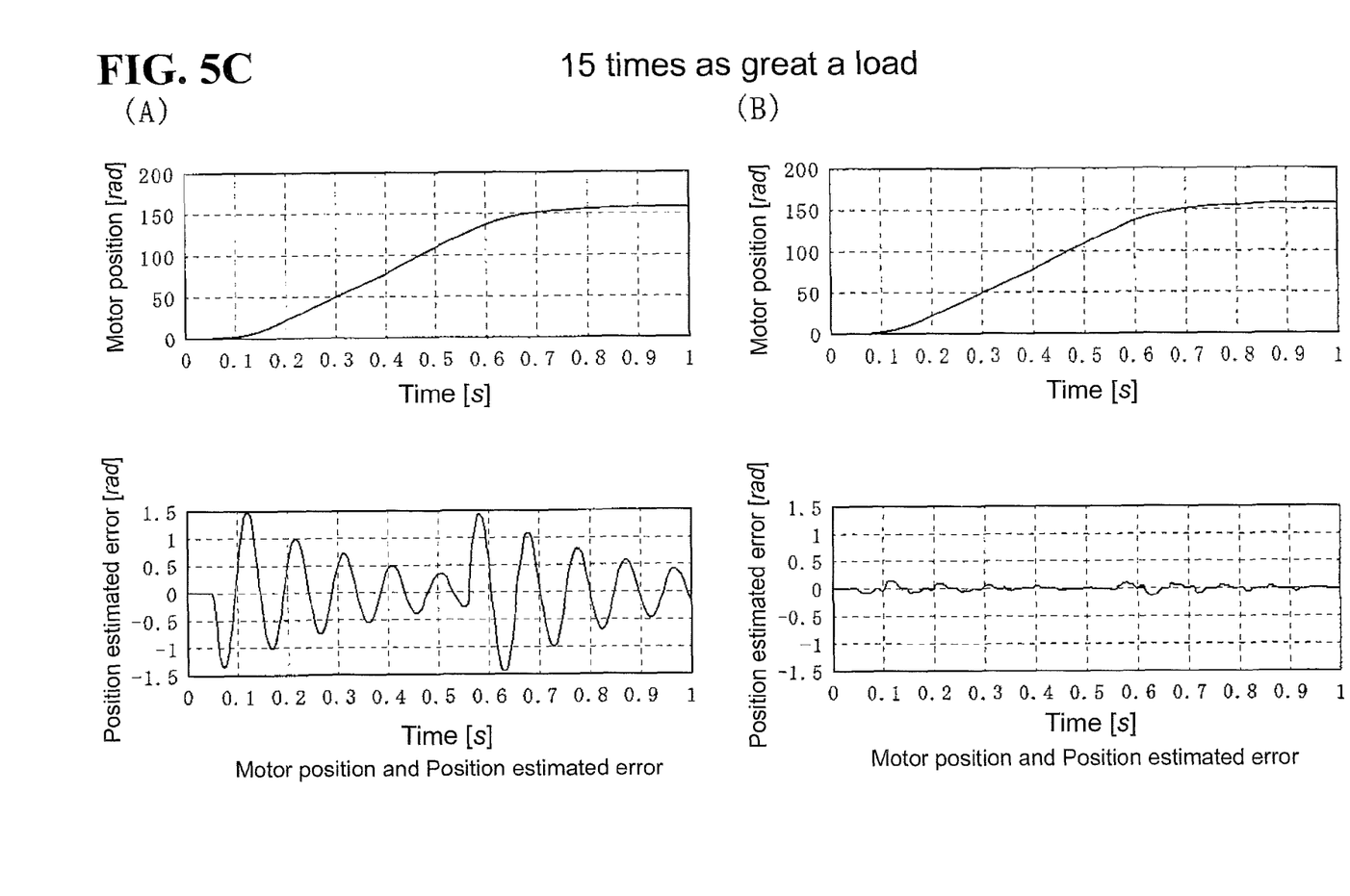
FIG. 5C shows a graph group (A) of a position estimated error associated with the conventional motor controller, and a graph group (B) of a position estimated error associated with the motor controller of the motor system according to the embodiment with a load inertia of 15 times the motor inertia.

A motor controller with a conventional observer to estimate motor position and motor speed, and the motor controller 100 according to this embodiment were used to obtain motor positions and position estimated errors in the cases where the motor 12 had a load inertia of 0.1 times, 3 times, and 15 times the motor inertia.

In the upper graphs of (A) and (B) shown in FIGS. 5A to 5C, time (s) is on the horizontal axis, and motor position (rad) is on the vertical axis. In the lower graphs, time (s) is on the horizontal axis, and position estimated error (rad) is on the vertical axis.

As clearly seen from FIGS. 5A to 5C, the position speed estimation section 120 of the motor controller 100 reduces the position estimated error even though the load inertia changes, as compared with the conventional examples.

The above-described embodiment and modification may be combined in any manner deemed suitable.

For example, the motor may be a linear motor. When the motor is a linear motor, it is possible to implement the motor controller with the torque command, the rotation speed, and the rotation position of the rotary motor being respectively replaced with thrust command, movement speed, and movement position.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A motor controller comprising:
  a position speed estimation section configured to output a motor estimated position and a motor estimated speed based on a position estimated error, the position estimated error being a difference between a motor position of a motor and the motor estimated position, the position speed estimation section comprising:
    an observer modifier configured to output an observer modification value based on the position estimated error;
    a nonlinear compensator configured to output a compensation torque based on the position estimated error;
    an operator configured to output an operation value based on the observer modification value and the compensation torque; and
    a motor model of the motor, the motor model being configured to output the motor estimated position and the motor estimated speed based on the operation value; and
  a control section configured to output a torque command based on the motor estimated position, the motor estimated speed, and a position command so as to control the motor.

2. The motor controller according to claim 1, wherein the operator comprises
  an adder configured to divide the torque command by an inertia nominal value of the motor to obtain a quotient, configured to add the quotient to the observer modification value to obtain a sum, and configured to output the sum, and
  a calculation distributor configured to add the compensation torque to the sum output from the adder based on an addition distribution determined using a weighting constant so as to obtain the operation value.

3. The motor controller according to claim 2, wherein the weighting constant comprises a first weighting constant dedicated to the sum and a second weighting constant dedicated to the compensation torque, the first weighting constant being smaller than the second weighting constant.

4. The motor controller according to claim 3, wherein the observer modifier is configured to multiply the position estimated error by an observer gain determined based on an observer cut-off frequency so as to obtain the observer modification value by PID control operation.

5. The motor controller according to claim 3, wherein the nonlinear compensator is configured to receive the motor position, the position estimated error, the torque command, and a product of the sum and the first weighting constant, and configured to obtain the compensation torque at least in accordance with a change in polarity of the product.

6. A motor system comprising:
  the motor controller according to claim 1;
  a motor controllable in accordance with a torque command output from the motor controller; and
  a position acquirer configured to acquire a motor position of the motor.

7. The motor controller according to claim 4, wherein the nonlinear compensator is configured to receive the motor position, the position estimated error, the torque command, and a product of the sum and the first weighting constant, and configured to obtain the compensation torque at least in accordance with a change in polarity of the product.

* * * * *